United States Patent
Hancock et al.

[15] 3,657,775
[45] Apr. 25, 1972

[54] TAPE JOINING CLIP

[72] Inventors: John B. Hancock, Tully; George R. Salbert, Syracuse, both of N.Y.

[73] Assignee: Advanced Digital Systems, Inc., Mohawk, N.Y.

[22] Filed: May 14, 1970

[21] Appl. No.: 37,262

[52] U.S. Cl. ..................................................24/230 R, 24/75
[51] Int. Cl. ....................................A44b 19/00, A44b 11/25
[58] Field of Search ..................24/75, 230, 230 S, 201 SL

[56] References Cited

UNITED STATES PATENTS 2,807,066  9/1957  Honey et al..............................24/75

FOREIGN PATENTS OR APPLICATIONS 83,720  4/1921  Austria...............................24/230 R
421,593  3/1965  Switzerland........................24/230 R

*Primary Examiner*—Paul R. Gilliam
*Attorney*—Roylance, Abrams, Berdo & Kaul

[57] ABSTRACT

A releasable connector having two elements, one being a U-shaped member of spring metal. The arms of the U are of different lengths, the shorter arm having an inwardly extending tooth or hook portion with a recess. The longer arm has an opening. The second element is flat with a pointed end which, when it is inserted in the recess of the hook portion, spreads the arms of the U and permits the second element to enter. The second element has an opening through which the hook portion can move, completing engagement of the two. Separation is accomplished by using the second element as a first base lever to spread the arms of the first element. Pivoting the second arm in the direction opposite the separating motion allows the elements to assume an angular relationship without separation.

4 Claims, 9 Drawing Figures

Patented April 25, 1972
3,657,775
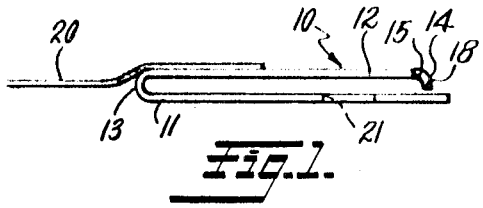
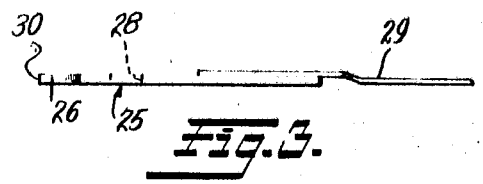
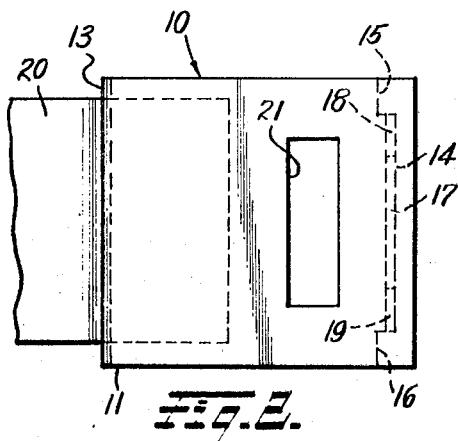
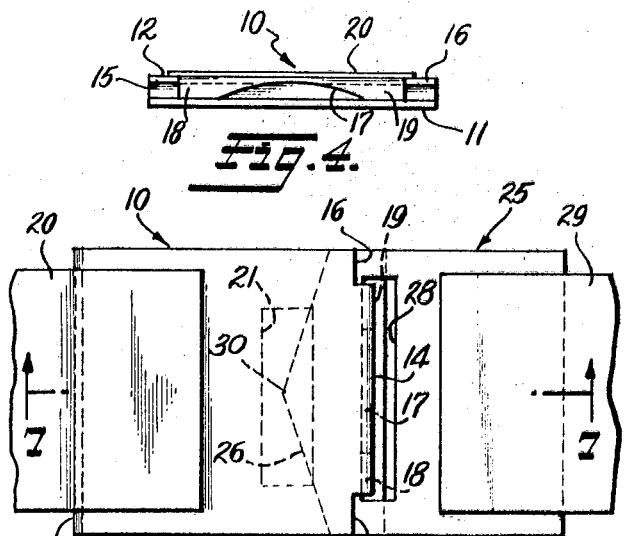
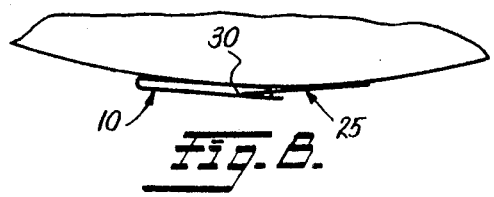
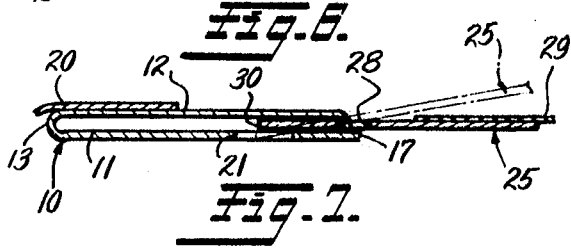
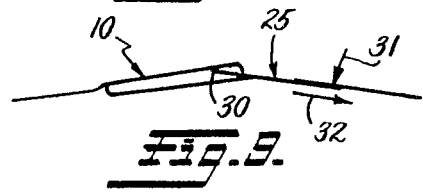
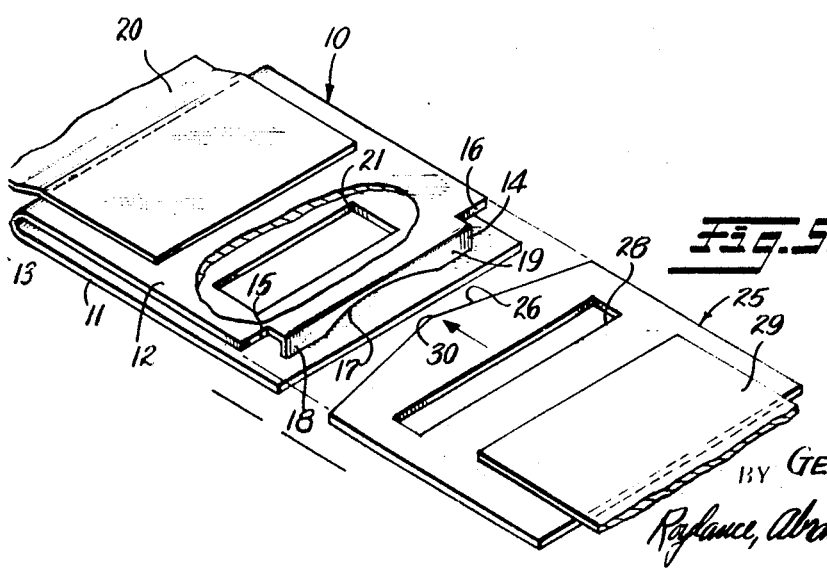
INVENTORS
JOHN B. HANCOCK
GEORGE R. SALBERT
BY
Raylance, Abrams, Kruger, Bordo & Kaul
ATTORNEYS

TAPE JOINING CLIP

This invention relates to a releasably connectable device and more specifically to means for interconnecting two ends of tape or any web-like material.

In the computer industry, as well as in other industries, it is desirable to be able to interconnect the ends of two pieces of strip material, such as magnetic tape or microfilm, quickly and securely with some device which will permit them to be readily disengaged. Further, it is desirable that the connecting means be flat, thin and simple so that it can be quickly and inexpensively produced and quickly and easily used. Still further, it is desirable that a connecting device be provided which can be adapted to connection and disconnection, or engagement and disengagement, by an automatic device if desired.

Especially in the computer industry, it is still further desirable that the connecting device be movable to an angular position, wherein one element of the connector is angularly related to the other, so that it can be wound on a tape spool without providing a large lump in the tape and without danger of the elements becoming disconnected. Heretofore, various connecting devices have been developed in an effort to provide these advantages. However, no such device has yet appeared which will satisfy the above requirements and still provide firm secure engagement of the joined ends while the apparatus is in use.

Accordingly, it is an object of the present invention to provide a releasable interconnecting device which meets the above requirements.

Briefly described, the invention includes a first connecting element which is flat and which has, at one end, means forming a camming surface. The first element also includes an opening and can be provided with a second opening to which the tape or web can be attached, although the tape can simply be adhered to the member without a second opening. A second element is formed in a U-shape with the arms of the U being separated by approximately the thickness of the first element. One arm of the U of the second element is shorter than the other arm, the shorter element having an end which is bent to form a hook-like portion which spans the gap between the arms. The hook-like portion has a recess to cooperate with the camming surface. The second member is resilient so that the arms of the U can be spread apart and will, when released, return to their original shape. The longer arm of the U has an opening through which the point of the first element can extend when the elements are joined and moved to an angle in one direction. The elements are joined by inserting the camming surface into the recess of the hook portion of the shorter arm, causing the arms to separate. The first element is further inserted until the hook enters the opening in the first element, completing the engagement of the elements. To separate the elements the first element is angularly moved relative to the second element so that the camming surface presses the shorter arm in the manner of a first class lever, thereby separating the arms and extracting the hook portion from the opening. The first element can then be extracted from the second, disconnecting the elements.

In order that the manner in which the foregoing and other advantages are attained in accordance with the invention can be understood in detail, particularly advantageous embodiments thereof will be described with reference to the accompanying drawings, which form a part of this specification and wherein:

FIG. 1 is a side elevation of one element of a device in accordance with the present invention;

FIG. 2 is a bottom view of the element of FIG. 1;

FIG. 3 is a side elevation of a second element connectable with the element of FIG. 1;

FIG. 4 is an end elevation of the element of FIG. 1;

FIG. 5 is a perspective view of the elements of FIGS. 1 and 2 shown in a position just prior to engagement;

FIG. 6 is a plan view of the elements of FIGS. 1–5 fully engaged;

FIG. 7 is a sectional view of the assembled elements;

FIG. 8 is a schematic view of the apparatus of FIGS. 4 and 5 shown engaged and on a tape spool; and FIG. 9 is a schematic diagram showing the elements being released.

Referring now to the drawings in detail, FIG. 1 shows a U-shaped element indicated generally at 10 in somewhat enlarged form. Element 10 is formed from a single strip of metal, such as beryllium copper or phosphor bronze or the like, or from a plastic such as polypropylene or polytetrafluoroethylene (TEFLON), or other known materials. Element 10 can also be formed from two separate pieces, joined at one end, but is preferably formed from one piece.

Element 10 includes a lower arm 11 and an upper arm 12 joined by a bend 13 of relatively short radius. The radius of bend 13 should be short enough so that the space between the interior surfaces of arms 11 and 12 is relatively small. As will be described hereinafter, the space should not greatly exceed the thickness of the member which is to be inserted therein. Arms 11 and 12 are essentially parallel to each other, except for the ends at bend 13 and at the distal end of arm 12 which includes a hook portion 14. Arm 12 is shorter than arm 11 so that portion 14, when bent perpendicular to arm 12, extends across the gap between the arms and contacts, or nearly contacts, the upper surface of arm 11.

As can be seen in FIGS. 2, 4, 5 and 6, the portion of arm 12 from which portion 14 is formed is of diminished width, there being notches 15 and 16 cut therefrom.

Portion 14 also includes an indentation 17 which extends upwardly from the distal end of portion 14 and is arcuate in shape. This arcuate cutout forms two teeth or hook portions 18 and 19 which, as will be described, engage the cooperating element. The end of a length of tape 20 is adhered to the upper surface of arm 12. It will be recognized that some materials can be suitably attached to member 10 by providing additional openings through the member and looping the tape or web therethrough. For magnetic tape, adhering the end thereof as shown is a suitable technique. An opening 21 of generally rectangular shape is provided in arm 11 and extends therethrough. Opening 21 is located between bend 13 and the point at which ends 18 and 19 contact the upper surface of arm 11. The exact location of opening 21 depends upon the dimensions and configuration of the cooperating element.

The other element of the device is shown in FIG. 3 and is generally indicated at 25. Element 25 is a flat, thin member having a generally rectangular shape but with one end formed with edges 26 and 27, as shown in FIG. 5, shaped to define a point 30 which is insertable into opening 17 to act as a camming surface or wedge for temporarily separating arms 11 and 12 to permit insertion of element 25. Element 25 is provided with a rectangular opening 28 through which the ends 18 and 19 of portion 14 of element 10 can protrude. The end of a piece of tape 29 is adhered to the upper surface of element 25, although it will be recognized that, for some materials, the tape can be looped through an additional opening in element 25 similar to the manner discussed with reference to element 10.

The elements of the device are engaged by holding them in parallel planes with element 25 lying in a plane parallel to, but between, the planes in which arms 11 and 12 lie. The members are then moved toward each other in a linear movement parallel to an imaginary line bisecting the angle between edges 26 and 27. As will be seen especially in FIG. 5, the upper portions of edges 26 and 27 engage arcuate opening 17 while the lower surface of element 25 presses against the upper surface of arm 11. Edges 26 and 27 thus act as camming surfaces against recess 17, moving recess 17 and ends 18 and 19 away from the upper surface of arm 11. Flexing occurs in one or more of arms 11 and 12 and bend 13, causing arms 11 and 12 to temporarily be distorted from their normally parallel condition until ends 18 and 19 are spaced from the upper surface of arm 11 by a distance equal to the thickness of element 25. Continuing the motion causes element 25 to enter between arms 11 and 12. When opening 28 is in register with end portion 14, arms 11 and 12 spring back to their original shape, permitting hook ends 18 and 19 to pass through opening 28 and again come in contact with, or closely adjacent to, the upper surface of arm 11. The elements are now fully engaged and a linear motion in the reverse direction will not cause disengagement.

It will now be seen as illustrated in FIG. 7 that the two elements can be caused to assume an angular relationship relative to each other wherein the ends of the elements farthest from each other can be moved upwardly, as shown in FIGS. 1, 3 or 7, or in a direction which would be out of the page as viewed in FIGS. 5 and 6. The pointed end 30 of element 25, including part of edges 26 and 27, move downwardly through opening 21, this opening being provided so that there is no lever action to separate arms 11 and 12. This angular motion in one direction is provided to permit the device to be part of a tape or web which is wrapped on a spool as schematically shown in FIG. 8. A considerable angle can be arrived at in this manner, depending upon the actual dimensions of openings 21 and 28 and the specific angle between edges 26 and 27. These dimensions would, clearly, be selected depending upon the specific application to which the device is to be put.

It will also be recognized that the gap between the inner surfaces of arms 11 and 12 should be on the same order of magnitude as the thickness of element 25 and should, in any event, not exceed twice the thickness of element 25. The importance of this will be more clearly recognized when considering the manner in which the elements are separated. The manner of separation is shown in the schematic diagram of FIG. 9 wherein element 25 is shown at an acute angle, on the order of more than 10°, with respect to side 11 of element 10. At this angle point 30 of element 25 contacts the inner surface of arm 12, and element 25 pivots about the distal end of arm 11 to form a first class lever, the fulcrum being the end of arm 11, the point of application of the work force being the point of contact between the tip 30 of element 25 and the interior of arm 12. The exterior application of force is at the opposite end of element 25 indicated by arrow 31. This motion pries the arms of element 10 apart, permitting element 25 to be extracted in the direction of arrow 32 in FIG. 9.

It will be recognized, from FIGS. 5 and 9, that the connecting and disconnecting operation of this device involves a simple linear motion to connect and a simple angular and linear motion to disconnect. The simplicity of these operations is of considerable advantage because it permits both operations to be accomplished by simple mechanical devices. It can, of course, be done manually with ease.

While one advantageous embodiment has been chosen to illustrate the invention, it will be understood by those skilled in the art that various changes and modifications can be made therein without departing from the scope of the invention as defined in the appended claims.

What is claimed is:
1. A releasable connecting device comprising
a first element constituting a single, flat member and having
two edges forming an obtuse angle and meeting at a point, with the angle lying in the plane of the flat member
the line bisecting said angle being a primary line of motion; and
a rectangular opening having two sides perpendicular to said primary line of motion; and
a second element formed from a single flat member bent double to form U-shape,
one end of one arm of said U-shape being shorter than the other and having a further bend forming at least one tooth which spans the gap of the U,
the longer arm of said U-shape including means defining a rectangular opening to permit angular movement between said elements in a first direction without disconnecting said elements;
said elements being connectable by inserting the point of said first element into the gap of said second element to spread the arms of said U until said at least one tooth enters said rectangular opening of said first element.
2. A device according to claim 1 wherein
said elements are disconnectable by moving them to an angle in excess of 10° in the second direction whereby said first element separates the arms of said second element in the manner of a first class lever.
3. A device according to claim 1 wherein
said arms of said U are parallel throughout substantially all of their length and are spaced apart a distance equal to not more than twice the thickness of said first element.
4. Apparatus for connecting together two ends of tape or the like comprising
a first connecting member comprising
a flat, thin substantially inflexible body having an opening therein, one end of said body having two edges shaped to form a point, the edges forming an angle which lies in the plane of the flat body,
one end of the tape being permanently secured to the other end of said first member opposite said point;
a second connecting member comprising a flat, thin strip of springy material bent near its midpoint to form a U-shaped body with the bend having a radius on the same order of magnitude as the thickness of the material, the two sides of the U-shaped body being parallel in an unstressed condition and being spaced apart a distance slightly more than the thickness of said first connecting member,
one of said sides having a length which is smaller, measured from the bend, than the length of the other, longer side, the distal end of said shorter side having an end portion extending perpendicularly toward the longer side, the sides of said end portion being in contact with said longer side when said second connecting member is in an unstressed condition,
said end portion of said shorter side being dimensioned to pass through the opening in said first connecting member when the two members are joined,
said end portion having a central recess to permit entry of the point on said first connecting member to separate the sides of said second connecting member and permit joining thereof by a simple linear motion.

* * * * *